No. 782,347.  Patented February 14, 1905.

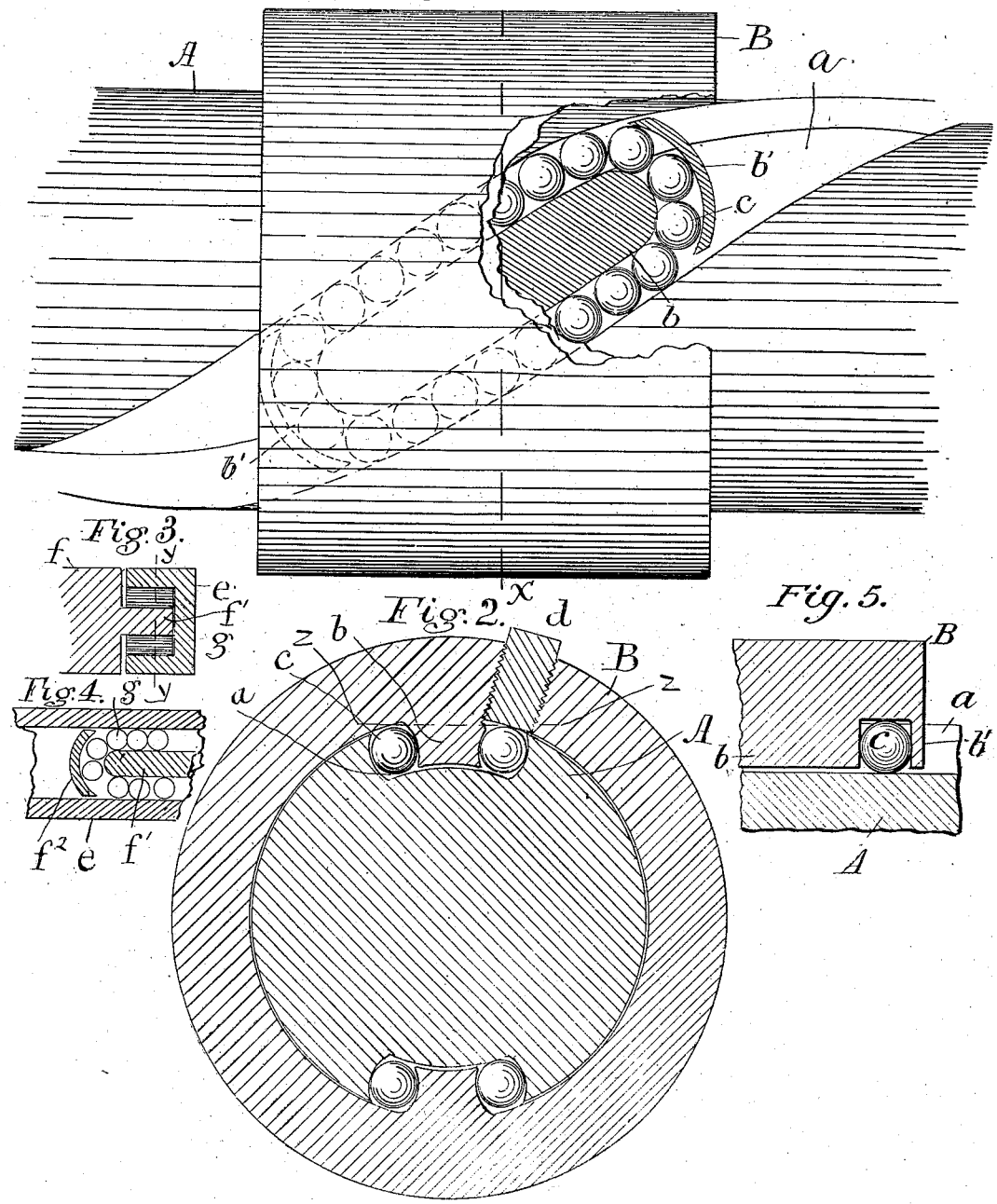

UNITED STATES PATENT OFFICE.

JOHN A. LIDBACK, OF PORTLAND, MAINE.

ROLLER-BEARING.

SPECIFICATION forming part of Letters Patent No. 782,347, dated February 14, 1905.

Application filed January 18, 1902. Renewed July 16, 1904. Serial No. 216,776.

*To all whom it may concern:*

Be it known that I, JOHN A. LIDBACK, a citizen of the United States of America, and a resident of Portland, Cumberland county, State of Maine, have invented certain new and useful Improvements in Roller-Bearings, of which the following is a specification.

My invention relates to roller-bearings of that class wherein two members are made to slide longitudinally one with relation to the other, either in straight lines, as in the case of a cross-head and its guides, or spirally, as in the case of a nut and screw.

The invention relates particularly to that class wherein antifriction balls or rollers are inserted between the sliding members.

I have illustrated my invention in the accompanying drawings by certain simple forms which show how the invention is to be applied.

In the drawings, Figure 1 is an elevation of a portion of a screw with a nut thereon, a portion of the nut being cut away on the dotted line $z\ z$ in Fig. 2. Fig. 2 is a section on the line $x\ x$ of Fig. 1. Fig. 3 is a section through a crosshead and its guide, showing the application of the device to straight work; and Fig. 4 is a section on the line $y\ y$ of Fig. 3. Fig. 5 is a detail longitudinal section through one end of the nut, showing the retainer $b'$ integral with the nut.

A in Figs. 1 and 2 represents a screw with a groove or thread $a$ cut in it with a sufficient pitch so that the nut B will run freely on it. The nut B has a tongue or projection $b$ extending inward into the groove, but narrow enough to leave room for the balls $c$ between the tongue and the sides of the groove. The balls are formed into an endless line, the ends of the line passing from one side of the tongue to the other through channels formed by flanges $b'$, which are, as here shown, formed integral with the nut. A plug $d$ is shown for introducing the balls into their groove. It will be seen that as these parts move longitudinally one with relation to the other the balls will roll between the two opposing surfaces and the pressure will be normal to the surface of the ball on its two opposite sides—that is to say, the conditions under which roller or ball bearings are used in journals and other like bearings will be present here and the friction of the nut and its screw will be very greatly reduced over the friction due to sliding contact.

In Figs. 3 and 4, $f$ represents the cross-head with a tongue $f'$ fitting loosely in the groove formed in the guide $e$. In this case I insert rollers $g$ between the tongue and the sides of the groove, since the movement is straight. The channel from one side of the tongue to the other is formed by the flange $f^2$.

While I have shown two forms of my device here, it is evident that the essential features of it may be used in a great variety of mechanical movements.

I claim—

1. An antifriction-bearing consisting of a screw and a nut having a thread loosely fitting between the threads of the screw, and an endless series of rolling members interposed between the thread of the nut and the threads of the screw, there being return-passages extending through the thread of the nut to form a complete circuit extending on opposite sides of the nut-thread, as set forth.

2. An antifriction-bearing consisting of a screw and a nut having a thread loosely fitting between the threads of the screw, and an endless series of rolling members interposed between the threads of the nut and the thread of the screw, there being return-passages extending through the thread of the nut to form a complete circuit extending on opposite sides of the nut-thread, and lateral extensions at each end of the thread of the nut, in position to retain the rolling members, as set forth.

3. An antifriction-bearing consisting of an inner member having a groove and an outer member having a thread loosely fitting between the threads of the inner member, and an endless series of rolling members interposed between the thread of the outer member and the threads of the inner member and forming a circuit on opposite sides of the thread of the outer member.

Signed at Portland, Maine, this 8th day of January, 1902.

JOHN A. LIDBACK.

Witnesses:
S. W. BATES,
W. M. CLEMENT.